US011410034B2

(12) United States Patent
Sethi et al.

(10) Patent No.: US 11,410,034 B2
(45) Date of Patent: Aug. 9, 2022

(54) COGNITIVE DEVICE MANAGEMENT USING ARTIFICIAL INTELLIGENCE

(71) Applicant: EMC IP Holding Company LLC, Hopkinton, MA (US)

(72) Inventors: Parminder Singh Sethi, Punjab (IN); Hung T. Dinh, Austin, TX (US); Sabu K. Syed, Austin, TX (US); Anay Kishore, Bihar (IN); Kannappan Ramu, Frisco, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 509 days.

(21) Appl. No.: 16/668,440

(22) Filed: Oct. 30, 2019

(65) Prior Publication Data

US 2021/0133554 A1 May 6, 2021

(51) Int. Cl.
*G06N 3/08* (2006.01)

(52) U.S. Cl.
CPC .................................... *G06N 3/08* (2013.01)

(58) Field of Classification Search
CPC ....................................................... G06N 3/08
See application file for complete search history.

(56) References Cited

U.S. PATENT DOCUMENTS 9,893,952 B2 2/2018 Wu et al.
10,388,272 B1 * 8/2019 Thomson ................ G06F 40/44
2003/0216912 A1 * 11/2003 Chino ..................... G10L 15/22 704/E15.04
2019/0007894 A1 1/2019 Subramanian et al.
2020/0175961 A1 * 6/2020 Thomson ................ G10L 15/28
2020/0241486 A1 * 7/2020 Hong ................. G05B 13/0265
2021/0335064 A1 * 10/2021 Kim ...................... B60W 50/04

FOREIGN PATENT DOCUMENTS

CN 112750465 A * 5/2021
EP 2148308 A2 * 1/2010 ......... G01C 21/3682

* cited by examiner

*Primary Examiner* — Mohammad K Islam
(74) *Attorney, Agent, or Firm* — Ryan, Mason & Lewis, LLP

(57) ABSTRACT

Methods, apparatus, and processor-readable storage media for cognitive device management using artificial intelligence are provided herein. An example computer-implemented method includes determining an initial telemetry data collection frequency value for a given device by applying machine learning techniques to historic data pertaining to additional devices; collecting an initial set of telemetry data associated with the given device and one or more subsequent sets of telemetry data associated with the given device in accordance with the initial telemetry data collection frequency value; performing a comparison of the one or more subsequent sets of telemetry data to the initial set of telemetry data; updating the initial telemetry data collection frequency value by applying the machine learning techniques to information resulting from the comparison; determining automated actions related to the given device by utilizing a neural network in connection with the collected telemetry data; and automatically initiating the automated actions.

20 Claims, 6 Drawing Sheets

COGNITIVE DEVICE MANAGEMENT USING ARTIFICIAL INTELLIGENCE

FIELD

The field relates generally to information processing systems, and more particularly to techniques for processing device-related data in such systems.

BACKGROUND

Telemetry data from devices in data centers are significant sources of information for technical support services. Accordingly, acquiring such data commonly requires running jobs on device management tools. Using conventional approaches, such jobs typically run at a single fixed frequency across all devices in a given data center. However, such static approaches often result in the jobs being run too frequently, which wastes system resources, and/or too infrequently, which impedes meaningful data collection.

SUMMARY

Illustrative embodiments of the disclosure provide techniques for cognitive device management using artificial intelligence. An exemplary computer-implemented method includes determining an initial telemetry data collection frequency value for a given device by applying one or more machine learning techniques to historic data pertaining to one or more additional devices, and configuring the given device with the initial telemetry data collection frequency value. Such a method also includes collecting an initial set of telemetry data associated with the given device and one or more subsequent sets of telemetry data associated with the given device in accordance with the initial telemetry data collection frequency value, and performing a comparison of at least a portion of the one or more subsequent sets of telemetry data to at least a portion of the initial set of telemetry data. Further, such a method additionally includes updating the initial telemetry data collection frequency value by applying the one or more machine learning techniques to information resulting from the comparison. Additionally, the method also includes determining one or more automated actions related to the given device by utilizing at least one neural network in connection with at least a portion of the collected telemetry data associated with the given device, and automatically initiating the one or more automated actions.

Illustrative embodiments can provide significant advantages relative to conventional techniques. For example, challenges associated with fixed frequency data acquisition are overcome in one or more embodiments through continuous implementation of machine learning techniques to determine efficient data collection frequency values.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated data centers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
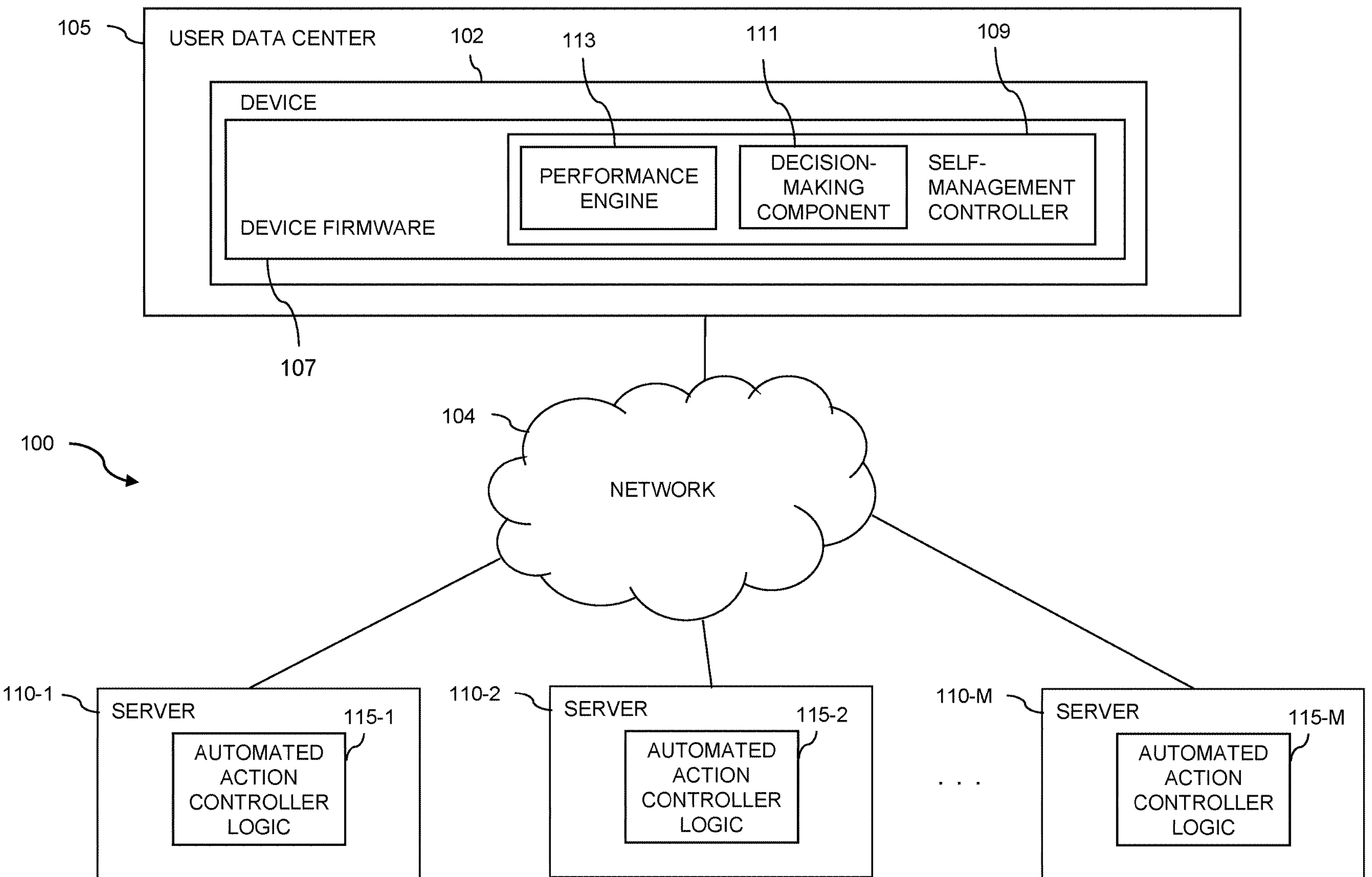
FIG. 1 shows an information processing system configured for cognitive device management using artificial intelligence in an illustrative embodiment.

FIG. 1 shows a computer network (also referred to herein as an information processing system) 100 configured in accordance with an illustrative embodiment. The computer network 100 comprises a plurality of servers 110-1, 110-2, . . . 110-M, collectively referred to herein as servers 110. Also, as further detailed herein, servers 110-1, 110-2, . . . , 110-M include automated action controller logic 115-1, 115-2, . . . , 115-M (collectively referred to herein as automated controller logic 115), respectively. The servers 110 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is user data center 105, which includes device 102.

The device 102 and the servers 110 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The device 102 and the servers 110 in some embodiments comprise respective computers associated with a particular company, organization, set of users, or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, one or more of the device 102 and servers 110 can have an associated database configured to store data pertaining to device management, which comprises, for example, device state information and related temporal information.

The database in such an embodiment is implemented using one or more storage systems associated with device 102 and/or servers 110. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of device 102 and servers 110 in one or more embodiments are input-output devices, which illustratively comprise keyboards, displays or other types of input-output devices in any combination. Such input-output devices can be used, for example, to support one or more user interfaces to device 102 and/or servers 110, as well as to support communication between device 102 and/or servers 110 and other related systems and devices not explicitly shown.

Additionally, in at least one embodiment, each of device 102 and servers 110 is assumed to be implemented using at least one processing device. Each such processing device generally comprises at least one processor and an associated memory, and implements one or more functional modules for controlling certain features of device 102 and servers 110.

More particularly, device 102 and servers 110 in such an embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the device 102 (via user data center 105) to communicate over the network 104 with servers 110 and vice versa, and illustratively comprises one or more conventional transceivers.

Additionally, as depicted in FIG. 1, the device 102 further comprises device firmware 107 which includes a self-management controller 109. The self-management controller 109, as illustrated in FIG. 1 and further detailed herein, includes a decision-making component 111 and a performance engine 113.

It is to be appreciated that this particular arrangement of elements illustrated in device 102 of the FIG. 1 embodiment is presented by way of example only, and alternative arrangements can be used in other embodiments. For example, the functionality associated with the self-management controller 109 in other embodiments can be combined into a single module, or separated across a larger number of modules. As another example, multiple distinct processors can be used to implement different ones of the self-management controller 109 or portions thereof. As yet another example, the self-management controller 109 in other embodiments can be separate from device 102, for example, as a standalone component within information processing system 100 or as a component within at least one of servers 110.

Additionally, at least portions of the self-management controller 109 may be implemented at least in part in the form of software that is stored in memory and executed by a processor.

It is to be understood that the particular set of elements shown in FIG. 1 for cognitive device management using artificial intelligence involving device 102 and servers 110 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing self-management controller 109 of an example device 102 in computer network 100 will be described in more detail with reference to the flow diagram of FIG. 4.

As also detailed herein, in at least one embodiment, the self-management controller 109 performs one or more management functions for the device 102. Within the self-management controller 109, the performance engine 113 carries out the collection of telemetry data and the decision-making component 111 determines one or more device management decisions and informs one or more other components (such as the performance engine 113 or the automated action controller logic 115 of a server 110, for example) of those decisions and the actions and/or steps required to carry out the decisions.

Accordingly, at least one embodiment of the invention includes utilizing machine learning techniques for autonomous device operation and management. Such device management areas can include, for example, issues pertaining to device failure, device configuration, device performance, device security, accounting, etc. Additionally, one or more embodiments operates on a device-by-device basis, wherein each device comprises a respective self-management controller unique and/or particular to that device.

As detailed herein, at least one embodiment includes implementing a self-management controller to periodically collect telemetry information from at least one device, analyze the collected telemetry information (via a decision-making component of the self-management controller), and instruct a performance engine (of the self-management controller) as to what automated actions are to be carried out in connection with the analyzed telemetry information and when such actions are to be carried out. In one or more embodiments, the automated actions are carried on by the self-management controller on the device from which the telemetry information was collected. In one or more alternate embodiments, the performance engine can output instructions to a separate and/or external server, which can then carry out the one or more automated actions via automated action controller logic resident on the server.

Additionally, in accordance with at least one embodiment, when a new device is configured, a default value for collection frequency is embedded into the decision-making component based (of the self-management controller resident on the new device), wherein such collection frequency can be determined based at least in part on data processed from similar devices and/or other relevant historical data. Once the device begins periodic collection of telemetry data, the decision-making component will retain the last read telemetry data and designate it as a baseline reading (also referred to herein as the Gold Copy). Every time additional telemetry data is subsequently collected, the collected telemetry data is compared with the last Gold Copy. Based on the comparison, one or more embodiments include updating the default value for collection frequency through utilization of reinforcement learning (RL) machine learning techniques, and over a given period of time, the decision-making component will learn (via the RL machine learning techniques) the most effective frequency for collecting telemetry data with respect to the device in question.

Also, in at least one embodiment, input to RL machine learning algorithms utilized includes hardware data, software data, logs, smart control logs, etc. Accordingly, using such RL machine learning algorithms, as further detailed herein, such an embodiment includes learning an effective frequency for telemetry data collection for a given device.

As noted above, one or more embodiments include setting a baseline. In such an embodiment, when the given device is setup, a value representing the frequency of telemetry data collection is set to a duration that is derived through the application of RL machine learning techniques to historic data pertaining to similar devices in a given community and/or within the data center of the given device. By way merely of illustration, assume that, in an example embodiment, this default value for the periodic collection of telemetry data is X hours. As soon as device is actively running, a decision-making component within the device will trigger periodic telemetry data collection in accordance with the default value (here, every X hours). The first collection can be treated as the Gold Copy (baseline reading). After X hours have transpired since the last telemetry data collection, the decision-making component (within the device) will trigger the next collection and the collected telemetry data will be compared with the Gold Copy. Such a comparison will show that the newly-collected telemetry data are either the same as the Gold Copy different from the Gold Copy in one or more respects.

Additionally, continuing with the above example, one or more embodiments include performing continuous optimization of the data collection frequency. In such an embodiment, the following processes are repeated to determine an optimal collection frequency value for the device. If a delta between the most recently collected telemetry data and the Gold Copy is found as a result of the comparison, then the next cycle for periodic collection is set as shorter than X hours, say Y hours. This value of Y hours can be derived through utilization of the same RL machine learning algorithms as used for determining the original baseline frequency.

If no delta is found between the most recently collected telemetry data and the Gold Copy as a result of the comparison, then the next cycle for periodic collection is set as longer than X hours, say Z hours. This value of Z hours can be derived through utilization of the same RL machine learning algorithms as used for determining the original baseline frequency.

Figure 2:
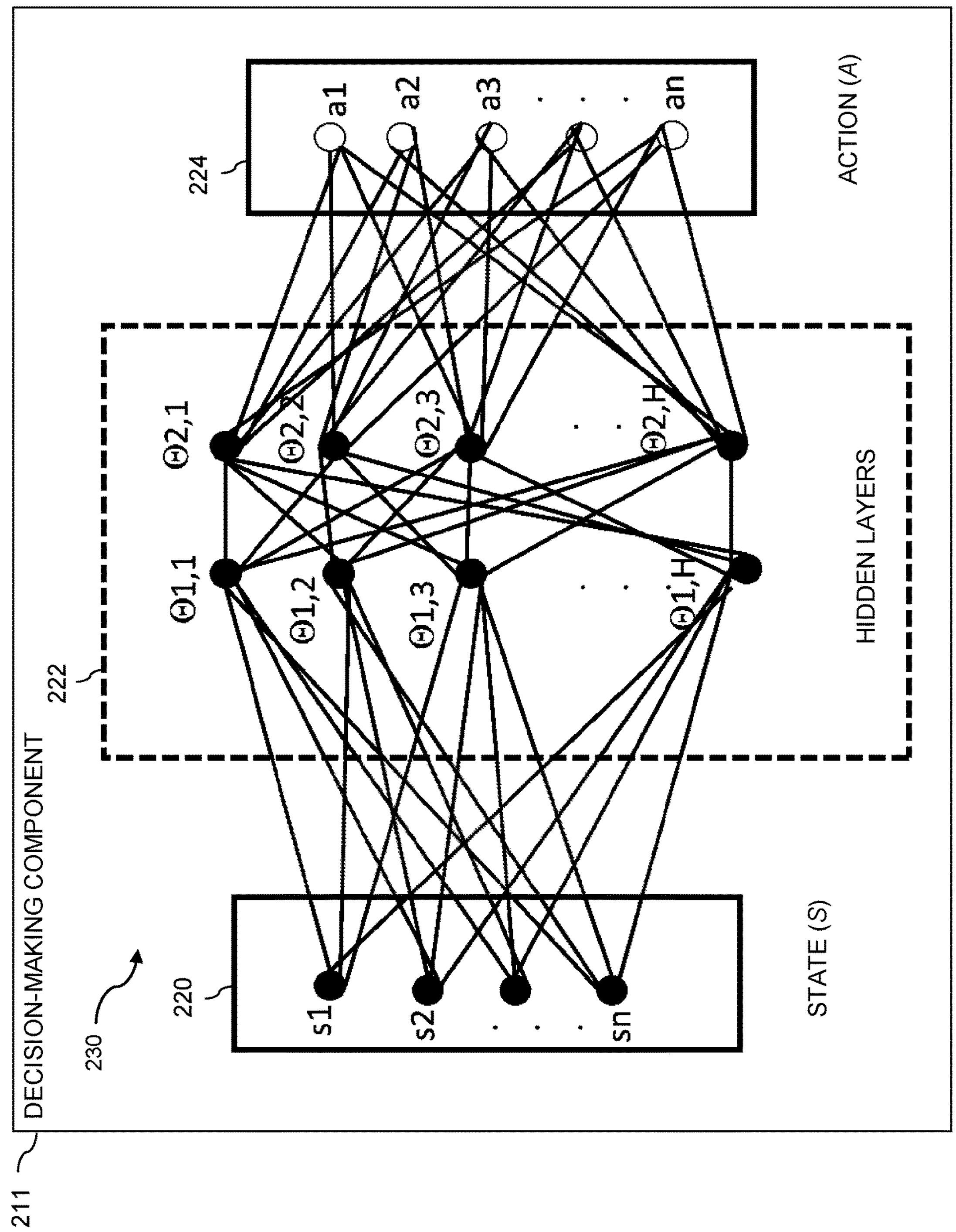
FIG. 2 shows a neural network architecture in an illustrative embodiment.

FIG. 2 shows a neural network architecture in an illustrative embodiment. By way of illustration, FIG. 2 depicts neural network architecture 230, which resides in decision-making component 211. Additionally, the neural network architecture 230 includes states (S) 220, hidden layers 222, and actions (A) 224. In an example embodiment such as depicted in FIG. 2, the neural network architecture 230 used for determining one or more automated actions (e.g., self-healing mechanisms) to be carried out in connection with analyzed device telemetry data includes two hidden layers 222 each of dimension H, and wherein the neural network architecture 230 further includes states 220 and actions 224 defined as $|S|=m$, and $|A|=n$, respectively.

Figure 3:
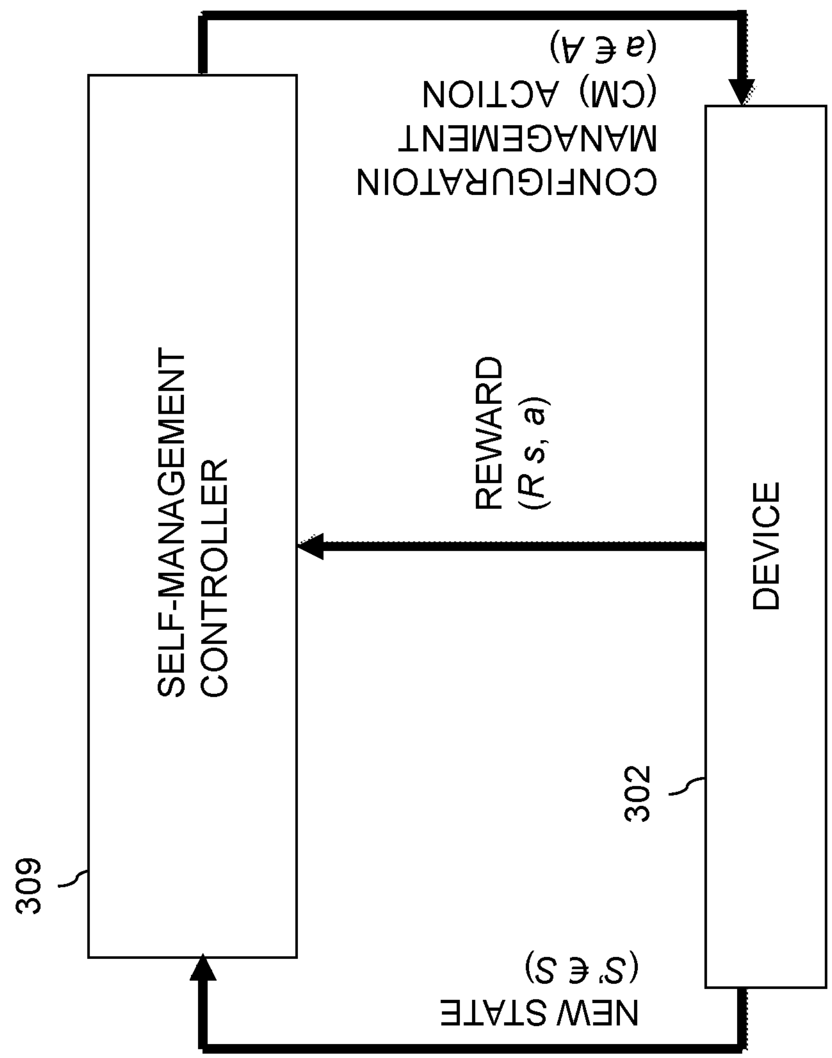
FIG. 3 shows a reinforcement learning cycle in an illustrative embodiment.

FIG. 3 shows a reinforcement learning cycle in an illustrative embodiment. By way of illustration, FIG. 3 depicts a reinforcement learning cycle between self-management controller 309 and device 302. Specifically, the self-management controller 309 receives information pertaining to a new device state (S' € S) from device 302, and using that information, the self-management controller 309 determines and outputs a configuration management (CM) action (a € A) back to the device 302. Additionally, based on one or more iterations of the above cycle, the device also sends a reward (R s, a) to the self-management controller 309. By way of example, an example embodiment such as depicted in FIG. 3 includes applying trial and error learning and a delayed reward mechanism to learn from the consequences of previous actions.

Accordingly, at least one embodiment includes implementing a value-based approach designed to find an optimal value function which is the maximum value function over one or more policies. Such an embodiment can include determining and/or selecting which actions to take (e.g., which policy to implement) based at least in part on the values generated from the RL machine learning techniques detailed herein.

As such, one or more embodiments include facilitating devices to be capable of collecting the telemetry data at optimal temporal frequencies, wherein such devices can manage their own components without the need of aggregators. Additionally, such an embodiment also includes initiating automated actions such as, for example, self-healing actions based on mapped actions originated from a reinforcement learning-based policy. Such actions can be carried out automatically and/or autonomously to remediate state information identified as likely to hinder availability of one or more systems associated with the device.

Figure 4:
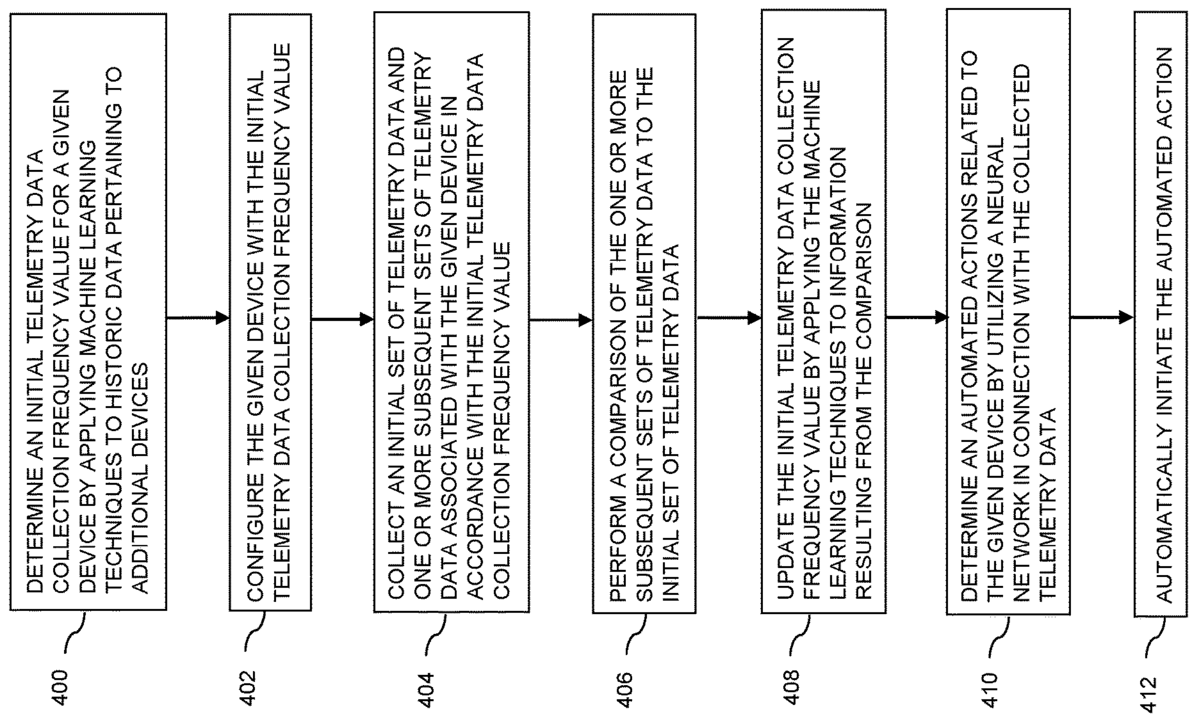
FIG. 4 is a flow diagram of a process for cognitive device management using artificial intelligence in an illustrative embodiment.

FIG. 4 is a flow diagram of a process for cognitive device management using artificial intelligence in an illustrative embodiment. It is to be understood that this particular process is only an example, and additional or alternative processes can be carried out in other embodiments.

In this embodiment, the process includes steps 400 through 412. These steps are assumed to be performed by self-management controller 109 utilizing its components 111 and 113.

Step 400 includes determining an initial telemetry data collection frequency value for a given device by applying one or more machine learning techniques to historic data pertaining to one or more additional devices. In at least one embodiment, the machine learning techniques can include reinforcement learning techniques. Also, the additional devices can include one or more devices within at least one data center associated with a common user to the given device, and the historic data can include hardware data, software data, and/or log data.

Step 402 includes configuring the given device with the initial telemetry data collection frequency value. Step 404 includes collecting an initial set of telemetry data associated with the given device and one or more subsequent sets of telemetry data associated with the given device in accordance with the initial telemetry data collection frequency value. Step 406 includes performing a comparison of at least a portion of the one or more subsequent sets of telemetry data to at least a portion of the initial set of telemetry data.

Step 408 includes updating the initial telemetry data collection frequency value by applying the one or more machine learning techniques to information resulting from the comparison. In one or more embodiments, updating the initial telemetry data collection frequency value includes decreasing the initial telemetry data collection frequency value upon a determination that the information resulting from the comparison indicates one or more changes in the one or more subsequent sets of telemetry data as compared to the initial set of telemetry data. In such an embodiment, decreasing the initial telemetry data collection frequency value includes decreasing the initial telemetry data collection frequency value by an amount determined in accordance with the application of the one or more machine learning techniques to the information resulting from the comparison.

Further, in at least one embodiment, updating the initial telemetry data collection frequency value includes increasing the initial telemetry data collection frequency value upon a determination that the information resulting from the comparison indicates no changes in the one or more subsequent sets of telemetry data as compared to the initial set of telemetry data. In such an embodiment, increasing the initial telemetry data collection frequency value includes increasing the initial telemetry data collection frequency value by an amount determined in accordance with the application of the one or more machine learning techniques to the information resulting from the comparison.

Step 410 includes determining one or more automated actions related to the given device by utilizing at least one neural network in connection with at least a portion of the collected telemetry data associated with the given device. In at least one embodiment, the at least one neural network includes at least two hidden layers, each of a given dimension.

Step 412 includes automatically initiating the one or more automated actions. In one or more embodiments, the automated actions include collecting one or more additional sets of telemetry data associated with the given device in accordance with the updated telemetry data collection frequency value, performing an additional comparison of at least a portion of the one or more additional sets of telemetry data to at least a portion of the one or more subsequent sets telemetry data, and updating the updated telemetry data collection frequency value by applying the one or more machine learning techniques to information resulting from the additional comparison. Also, in at least one embodiment, the automated actions can include one or more remedial actions directed to a device state identified by utilizing the at least one neural network and/or one or more configuration management modifications.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to enable collection of telemetry data in accordance with optimal temporal parameters determined via utilization of machine learning techniques. These and other embodiments can effectively generate more efficient data center device operations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
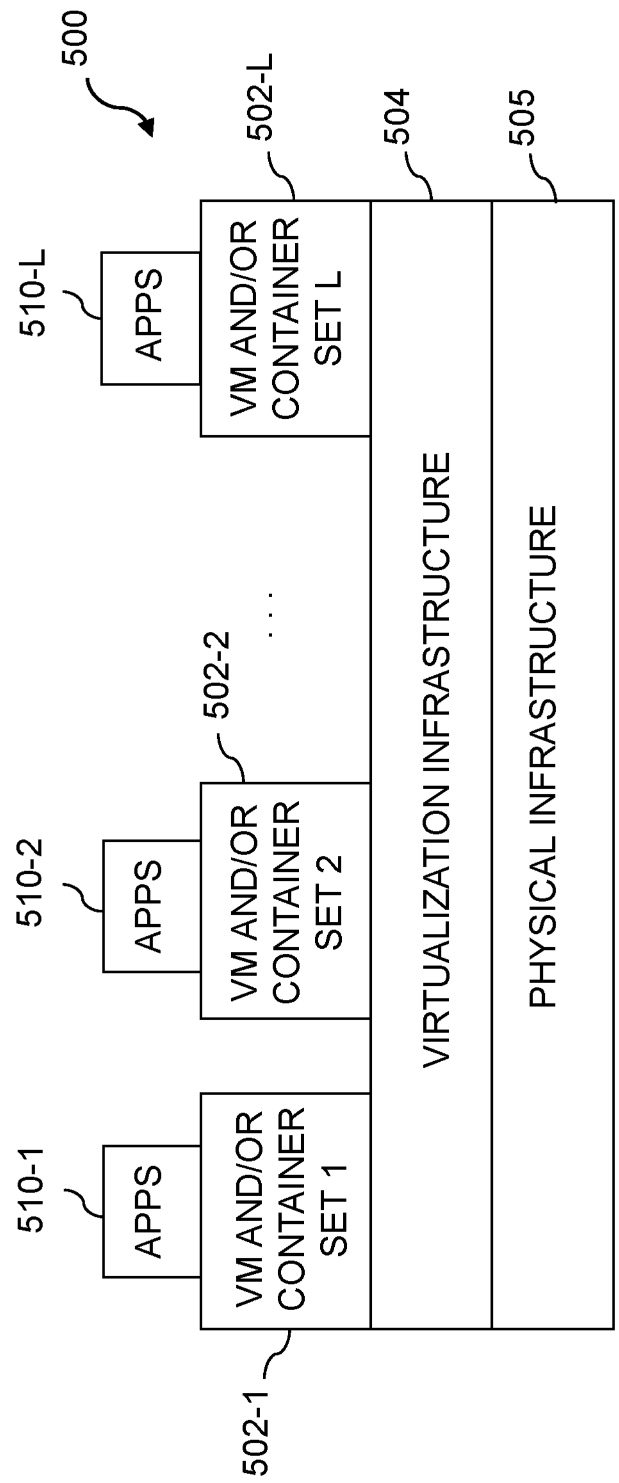
FIGS. 5 and 6 show examples of processing platforms that may be utilized to implement at least a portion of an information processing system in illustrative embodiments.
Figure 6:
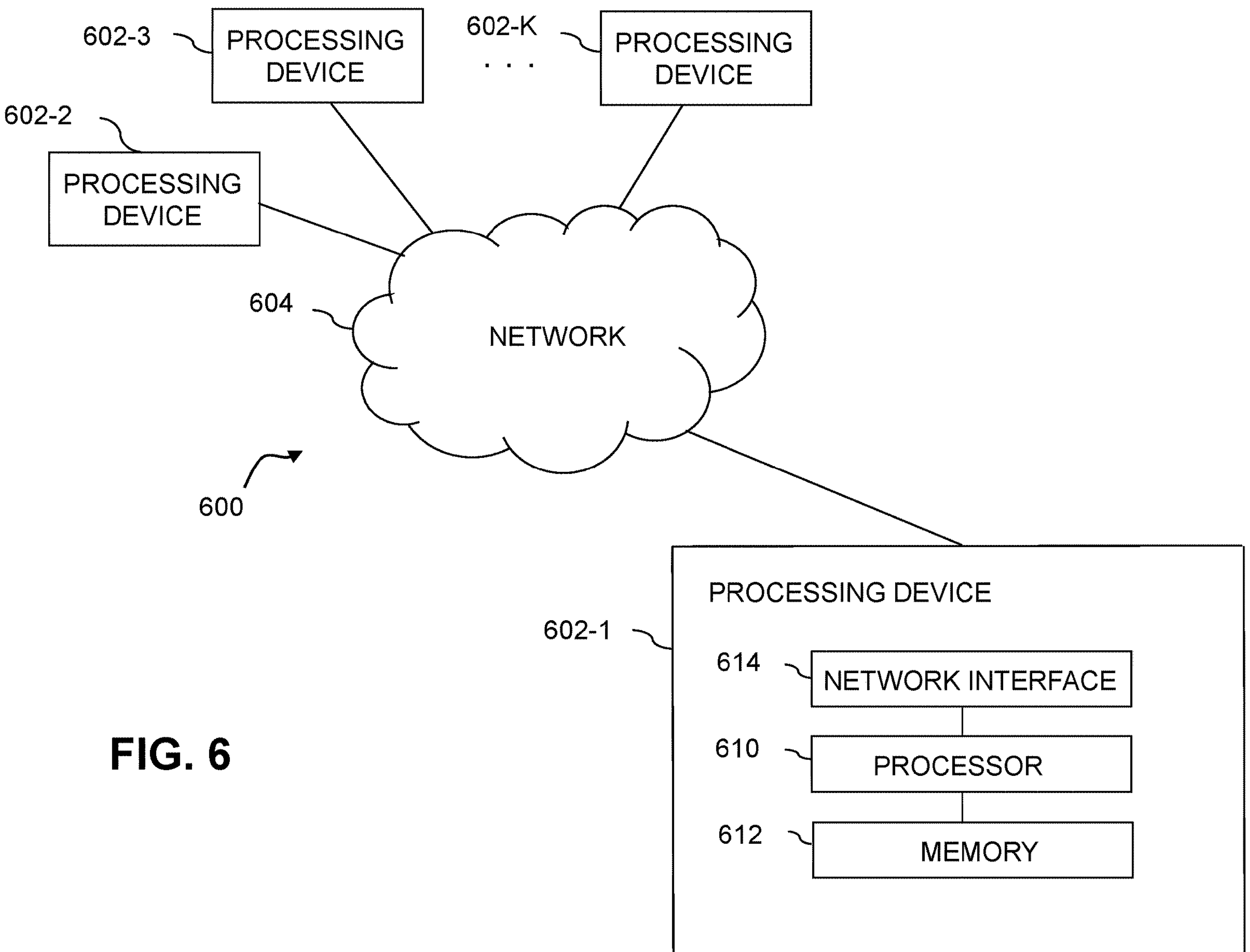

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of devices, data centers, and servers in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

determining an initial telemetry data collection frequency value for a given device by applying one or more machine learning techniques to historic data pertaining to one or more additional devices;

configuring the given device with the initial telemetry data collection frequency value;

collecting an initial set of telemetry data associated with the given device and one or more subsequent sets of telemetry data associated with the given device in accordance with the initial telemetry data collection frequency value;

performing a comparison of at least a portion of the one or more subsequent sets of telemetry data to at least a portion of the initial set of telemetry data;

updating the initial telemetry data collection frequency value by applying the one or more machine learning techniques to information resulting from the comparison;

determining one or more automated actions related to the given device by utilizing at least one neural network in connection with at least a portion of the collected telemetry data associated with the given device; and automatically initiating the one or more automated actions;

wherein the method is performed by at least one processing device comprising a processor coupled to a memory.

2. The computer-implemented method of claim 1, wherein the one or more machine learning techniques comprise reinforcement learning techniques.

3. The computer-implemented method of claim 1, wherein the at least one neural network comprises at least two hidden layers of a given dimension.

4. The computer-implemented method of claim 1, wherein the one or more automated actions comprise:

collecting one or more additional sets of telemetry data associated with the given device in accordance with the updated telemetry data collection frequency value;

performing an additional comparison of at least a portion of the one or more additional sets of telemetry data to at least a portion of the one or more subsequent sets telemetry data; and updating the updated telemetry data collection frequency value by applying the one or more machine learning techniques to information resulting from the additional comparison.

5. The computer-implemented method of claim 1, wherein updating the initial telemetry data collection frequency value comprises decreasing the initial telemetry data collection frequency value upon a determination that the information resulting from the comparison indicates one or more changes in the one or more subsequent sets of telemetry data as compared to the initial set of telemetry data.

6. The computer-implemented method of claim 5, wherein decreasing the initial telemetry data collection frequency value comprises decreasing the initial telemetry data collection frequency value by an amount determined in accordance with the application of the one or more machine learning techniques to the information resulting from the comparison.

7. The computer-implemented method of claim 1, wherein updating the initial telemetry data collection frequency value comprises increasing the initial telemetry data collection frequency value upon a determination that the information resulting from the comparison indicates no changes in the one or more subsequent sets of telemetry data as compared to the initial set of telemetry data.

8. The computer-implemented method of claim 7, wherein increasing the initial telemetry data collection frequency value comprises increasing the initial telemetry data collection frequency value by an amount determined in accordance with the application of the one or more machine learning techniques to the information resulting from the comparison.

9. The computer-implemented method of claim 1, wherein the one or more automated actions comprise one or more remedial actions directed to a device state identified by utilizing the at least one neural network.

10. The computer-implemented method of claim 1, wherein the one or more automated actions comprise one or more configuration management modifications.

11. The computer-implemented method of claim 1, wherein the one or more additional devices comprise one or more devices within at least one data center associated with a common user to the given device.

12. The computer-implemented method of claim 1, wherein the historic data comprise one or more of hardware data, software data, and log data.

13. A non-transitory processor-readable storage medium having stored therein program code of one or more software programs, wherein the program code when executed by at least one processing device causes the at least one processing device:

to determine an initial telemetry data collection frequency value for a given device by applying one or more machine learning techniques to historic data pertaining to one or more additional devices;

to configure the given device with the initial telemetry data collection frequency value;

to collect an initial set of telemetry data associated with the given device and one or more subsequent sets of telemetry data associated with the given device in accordance with the initial telemetry data collection frequency value;

to perform a comparison of at least a portion of the one or more subsequent sets of telemetry data to at least a portion of the initial set of telemetry data;

to update the initial telemetry data collection frequency value by applying the one or more machine learning techniques to information resulting from the comparison;

to determine one or more automated actions related to the given device by utilizing at least one neural network in connection with at least a portion of the collected telemetry data associated with the given device; and to automatically initiate the one or more automated actions.

14. The non-transitory processor-readable storage medium of claim 13, wherein the one or more machine learning techniques comprise reinforcement learning techniques.

15. The non-transitory processor-readable storage medium of claim 13, wherein the at least one neural network comprises at least two hidden layers of a given dimension.

16. The non-transitory processor-readable storage medium of claim 13, wherein the one or more automated actions comprise:

collecting one or more additional sets of telemetry data associated with the given device in accordance with the updated telemetry data collection frequency value;

performing an additional comparison of at least a portion of the one or more additional sets of telemetry data to at least a portion of the one or more subsequent sets telemetry data; and updating the updated telemetry data collection frequency value by applying the one or more machine learning techniques to information resulting from the additional comparison.

17. An apparatus comprising:

at least one processing device comprising a processor coupled to a memory;

the at least one processing device being configured:

to determine an initial telemetry data collection frequency value for a given device by applying one or more machine learning techniques to historic data pertaining to one or more additional devices;

to configure the given device with the initial telemetry data collection frequency value;

to collect an initial set of telemetry data associated with the given device and one or more subsequent sets of telemetry data associated with the given device in accordance with the initial telemetry data collection frequency value;

to perform a comparison of at least a portion of the one or more subsequent sets of telemetry data to at least a portion of the initial set of telemetry data;

to update the initial telemetry data collection frequency value by applying the one or more machine learning techniques to information resulting from the comparison;

to determine one or more automated actions related to the given device by utilizing at least one neural network in connection with at least a portion of the collected telemetry data associated with the given device; and to automatically initiate the one or more automated actions.

18. The apparatus of claim 17, wherein the one or more machine learning techniques comprise reinforcement learning techniques.

19. The apparatus of claim 17, wherein the at least one neural network comprises at least two hidden layers of a given dimension.

20. The apparatus of claim 17, wherein the one or more automated actions comprise:

collecting one or more additional sets of telemetry data associated with the given device in accordance with the updated telemetry data collection frequency value;

performing an additional comparison of at least a portion of the one or more additional sets of telemetry data to at least a portion of the one or more subsequent sets telemetry data; and updating the updated telemetry data collection frequency value by applying the one or more machine learning techniques to information resulting from the additional comparison.

* * * * *

UNITED STATES PATENT AND TRADEMARK OFFICE

CERTIFICATE OF CORRECTION

PATENT NO. : 11,410,034 B2
APPLICATION NO. : 16/668440
DATED : August 9, 2022
INVENTOR(S) : Parminder Singh Sethi et al.

It is certified that error appears in the above-identified patent and that said Letters Patent is hereby corrected as shown below:

In the Claims

In Claim 4, Column 12, Lines 3-4, replace "one or more subsequent sets telemetry data" with -- one or more subsequent sets of telemetry data --.

In Claim 16, Column 13, Lines 29-30, replace "one or more subsequent sets telemetry data" with -- one or more subsequent sets of telemetry data --.

In Claim 20, Column 14, Lines 36-37, replace "one or more subsequent sets telemetry data" with -- one or more subsequent sets of telemetry data --.

Signed and Sealed this
First Day of August, 2023

Katherine Kelly Vidal

Katherine Kelly Vidal
*Director of the United States Patent and Trademark Office*